United States Patent
Mani

(10) Patent No.: US 8,514,083 B2
(45) Date of Patent: Aug. 20, 2013

(54) ANTENNA FOR AN ELECTRONIC TAG

(75) Inventor: Christophe Mani, Cavaillon (FR)

(73) Assignee: STMicroelectronics S.A., Montrouge (FR)

( * ) Notice: Subject to any disclaimer, the term of this patent is extended or adjusted under 35 U.S.C. 154(b) by 503 days.

(21) Appl. No.: 11/918,372

(22) PCT Filed: Apr. 18, 2006

(86) PCT No.: PCT/FR2006/000857
§ 371 (c)(1),
(2), (4) Date: Nov. 26, 2008

(87) PCT Pub. No.: WO2006/108970
PCT Pub. Date: Oct. 19, 2006

(65) Prior Publication Data
US 2009/0146819 A1    Jun. 11, 2009

(30) Foreign Application Priority Data

Apr. 15, 2005 (FR) ..................... 05 50964

(51) Int. Cl.
*G08B 13/14* (2006.01)
(52) U.S. Cl.
USPC ............. 340/572.7; 340/572.1; 340/572.8; 343/700 MS; 174/250; 174/260; 29/846; 29/852

(58) Field of Classification Search
USPC ...... 340/572.7, 572.8, 572.6, 572.1; 343/700 MS, 895, 867, 788, 787, 741; 427/116; 29/847, 29/830, 846, 852; 174/260, 250
See application file for complete search history.

(56) References Cited

U.S. PATENT DOCUMENTS

| | | | | |
|---|---|---|---|---|
| 4,583,099 A | * | 4/1986 | Reilly et al. | 343/895 |
| 5,574,470 A | * | 11/1996 | de Vall | 343/895 |
| 5,608,417 A | * | 3/1997 | de Vall | 343/895 |
| 5,864,323 A | * | 1/1999 | Berthon | 343/788 |
| 6,025,725 A | * | 2/2000 | Gershenfeld et al. | 324/652 |
| 6,229,444 B1 | * | 5/2001 | Endo et al. | 340/572.6 |
| 6,930,646 B2 | * | 8/2005 | Yahata et al. | 343/718 |
| 7,113,131 B2 | * | 9/2006 | Burke | 343/700 MS |
| 7,256,697 B2 | * | 8/2007 | Sakama et al. | 340/572.8 |

(Continued)

FOREIGN PATENT DOCUMENTS

| | | |
|---|---|---|
| DE | 19536464 | 4/1997 |
| WO | WO 99/04295 | 1/1999 |

OTHER PUBLICATIONS

International Search Report from corresponding International Application No. PCT/FR2006/000857, filed Apr. 18, 2006.

(Continued)

*Primary Examiner* — Hoi Lau
(74) *Attorney, Agent, or Firm* — Wolf, Greenfield & Sacks, P.C.

(57) ABSTRACT

The invention concerns an inductive element for forming an electromagnetic transponder antenna, comprising a first group of mutually parallel conductors coplanar in a first plane, a second group of mutually parallel conductors coplanar in a second plane parallel to the first plane, and an insulating material separating the two groups of conductors, one end of each conductor of the first group being connected to one end of a conductor of the second group whereof the other end is connected to one end of another conductor of the first group, the connections between the conductors being conductive via holes in the thickness of the insulating material.

13 Claims, 2 Drawing Sheets

(56) References Cited

U.S. PATENT DOCUMENTS

| | | | |
|---|---|---|---|
| 7,495,625 B2* | 2/2009 | Endo et al. | 343/788 |
| 2001/0002874 A1* | 6/2001 | Sakamoto et al. | 361/737 |
| 2003/0114118 A1* | 6/2003 | Fukushima et al. | 455/82 |
| 2004/0026519 A1* | 2/2004 | Usami et al. | 235/492 |
| 2005/0072595 A1* | 4/2005 | Cho | 174/260 |
| 2005/0122211 A1* | 6/2005 | Yoshigi et al. | 340/10.1 |
| 2005/0162331 A1* | 7/2005 | Endo et al. | 343/788 |
| 2005/0179552 A1* | 8/2005 | Shoji et al. | 340/572.7 |
| 2005/0237197 A1* | 10/2005 | Liebermann et al. | 340/572.6 |
| 2006/0010685 A1* | 1/2006 | Kobayashi et al. | 29/825 |
| 2006/0290512 A1* | 12/2006 | Shanton | 340/572.7 |

OTHER PUBLICATIONS

Patent Abstracts of Japan, vol. 2003, No. 12, Dec. 5, 2003 & JP 2004 165531 A (Dainippon Printing Co. Ltd.) Jun. 10, 2004.

* cited by examiner

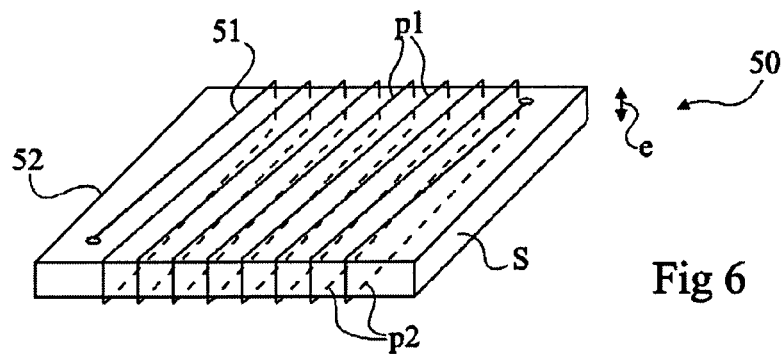
Fig 6
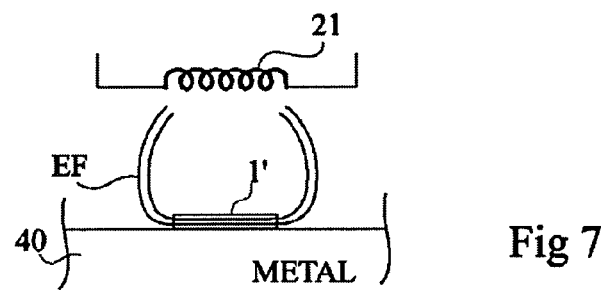
Fig 7
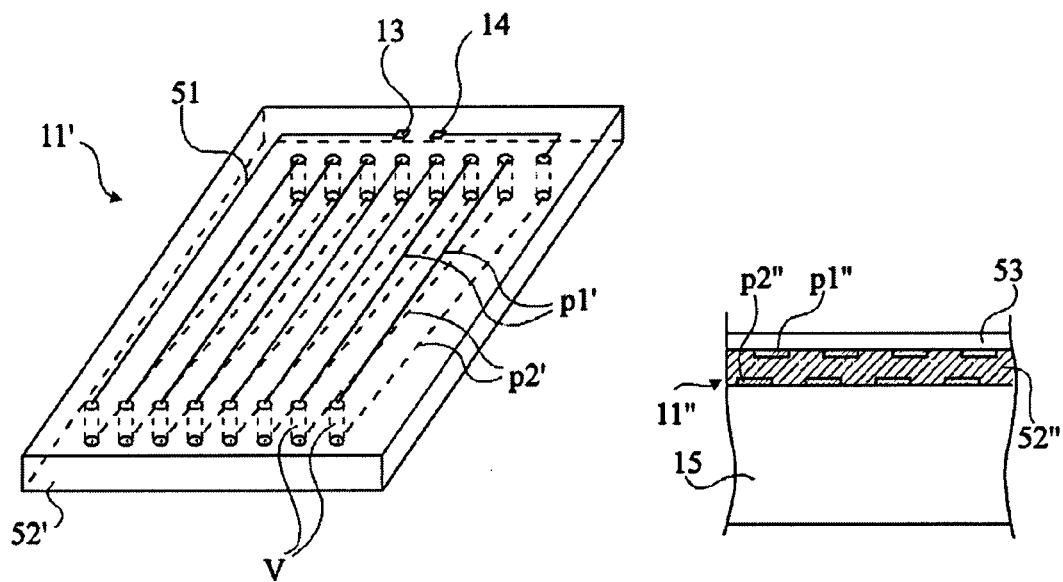
Fig 8
Fig 9

ANTENNA FOR AN ELECTRONIC TAG

BACKGROUND OF THE INVENTION

1. Field of the Invention

The present invention generally relates to electromagnetic transponder systems and, more specifically, to electromagnetic transponders that do not have their own power supply, but rather which extract the power required for the operation of the electronic circuits comprised therein from an electromagnetic field radiated by a read and/or read/write terminal.

An example of application of the present invention relates to electronic tags (TAG) comprising an electronic chip and a radio-frequency field reception antenna.

2. Discussion of the Related Art

FIG. 1 is a schematic block diagram illustrating an example of an electromagnetic transponder system of the type to which the present invention applies. An electronic tag 1 forming an electromagnetic transponder is based on an oscillating circuit 10 formed, for example, of an inductive element 11 in parallel with a capacitive element 12 between two terminals 13 and 14 of circuit 10. Terminals 13 and 14 are connected to an electric circuit 15 (IC), generally a single integrated circuit, intended to exploit the voltage sampled across oscillating circuit 10 when tag 1 is a radio-frequency field radiated by a terminal 2 (READER) or read or read/write terminal. Terminal 2 comprises an oscillating circuit 20 based on an inductive element 21 forming an antenna, for example, in series with a capacitive element 22 and a resistive element 26 between two terminals 23 and 24 of an electronic circuit 25 (ICS). Circuit 25 comprises one or several integrated circuits for exciting the oscillating circuit and interpreting possible transmissions coming from electronic tag 1.

The operation of such a system is based on the coupling of oscillating circuits 20 and 10 of terminal 2 and of transponder 1. On the side of terminal 2, circuit 25 generates a high-frequency excitation signal (typically with a carrier at a frequency on the order of 13.56 MHz or on the order of 125 kHz according to applications). This signal is applied to antenna 21 of generation of an electromagnetic field in the vicinity of the terminal. When a transponder 1 is in the field of the terminal, its antenna 11 collects the power radiated by the terminal and resonant circuit 10 develops between its terminals 13 and 14 a voltage exploitable by circuit 15. Oscillating circuits 10 and 20 are generally tuned to a same resonance frequency approximately corresponding to the carrier frequency of the signal transmitted by the terminal. Generally, circuit 15 has no autonomous power supply and samples the power necessary for its operation from the field radiated by the terminal. Circuit 15 integrates so-called back-modulation means for modifying the load formed by transponder 1 in the field of the terminal to enable a communication in the transponder-to-terminal direction. On the side of terminal 2, the voltage across capacitive element 22 is for example measured, the interconnection point between antenna 21 and capacitor 22 being connected (connection 27) to circuit 25 to enable demodulation of transponder-to-terminal transmissions. According to applications, the high-frequency carrier generated by terminal 2 may also be modulated to transmit information to the transponder.

FIG. 2 very schematically shows, in top view, an example of an electronic tag 1 of the type to which the present invention more specifically applies. Such a tag is formed of a plate 16 (flexible or rigid) on which is deposited a metal 11 in the form of a planar winding of concentric spirals to form the antenna, the two ends of track 11 being connected to terminals of circuit 15, here assumed to integrate capacitor 12.

A tag 1 such as illustrated in FIG. 2 is generally associated with an object or an element, for example, for identification purposes. These may be products (for example, products for sale in a store), smart cards in access-control applications, etc. More generally, an electronic tag may be associated with any object or system (for example, a vehicle) for identification, counting, or other purposes.

FIG. 3 shows an example of an object 30 on which (for example glued) a tag 1 of the type illustrated in FIG. 2 is placed. Product 30 is assumed to be made of an insulating material (DIEL), for example, cardboard, plastic matter, etc. When the planar antenna (not visible in FIG. 3) of tag 1 is close to a reader (represented in FIG. 3 by its antenna 21), the electric field of antenna 21 is likely to be sensed by product 1, field lines EF crossing plate 16 (FIG. 2) of tag 1 and object 30 by passing through the center of planar winding 11.

A problem is however posed in the case where tag 1 is placed on a metal object at least at the surface thereof. Indeed, the electromagnetic field is disturbed by this object that it cannot cross. Further, this causes a detuning of the oscillating circuits of the terminal and of the transponder, which adversely affects the remote supply of the tag and the information transmission.

FIG. 4 very schematically shows a first known example of a solution for placing a planar-antenna electronic tag 1 on a metal object 40 (METAL). This solution consists of interposing a spacer 41 formed of an insulating block between tag 1 and object 40. A disadvantage is the bulk of spacer 41, the thickness of which must in practice be greater than 5 millimeters to enable field lines EF to come out through the lateral surfaces of this spacer.

FIG. 5 very schematically shows a second conventional example of a solution for placing an electronic tag 1 on a metal object 40. In this solution, a ferrite spacer 43 is interposed between metal object 40 and electronic tag 1. The use of a ferrite spacer enables reducing the thickness of this spacer, the ferromagnetic material conducting the field to enable looping back of the field lines and avoid the metal disturbance. A disadvantage of ferrite or another ferromagnetic material is that such materials are expensive, in practice incompatible with the low costs desired for electronic tag systems.

The problem of the disturbance created by a metal object on the operation of a transponder system is all the more critical as the carrier frequency is high. Indeed, the higher the frequency, the smaller the number of turns of planar winding 11 of the antenna (typically from 1 to 3 turns for a 13.56-MHz frequency). Now, the smaller the number of turns, the lower the coupling and the more the system is sensitive to disturbances.

SUMMARY OF THE INVENTION

The present invention aims at overcoming all or part of the disadvantages of known transponder systems. The present invention more specifically aims at providing an electronic tag structure that can be directly affixed on a metal object without adversely affecting operation of the electronic tag.

The present invention also aims at providing a solution which is particularly well adapted to frequencies of several MHz.

The present invention also aims at providing an economical solution avoiding use of a ferromagnetic material.

To achieve all or part of these and other objects, the present invention provides an inductive element, comprising:

a first group of parallel conductive tracks coplanar in a first plane;

a second group of parallel conductive tracks coplanar in a second plane parallel to the first plane; and an insulating material separating the two groups of tracks, one end of each track of the first group being connected to an end of a track of the second group having its other end connected to an end of another track of the first group, the connections between tracks being conductive vias that cross the insulating material.

According to an embodiment of the present invention, each group of tracks is deposited on one of the surfaces of an insulating support perforated pierced with through metallized holes forming said vias.

According to an embodiment of the present invention, the insulator support is a printed circuit wafer.

According to an embodiment of the present invention, each group of conductive tracks is formed in a metal level placed on a semiconductor wafer with an interposed insulating layer in which are formed said vias.

The present invention also provides an antenna for receiving a radio-frequency transmission, comprising such an inductive element.

The present invention also provides an electromagnetic transponder comprising such an antenna.

According to an embodiment of the present invention, electronic circuits of the transponder are formed in the semiconductor wafer underlying the antenna.

According to an embodiment of the present invention, the transponder is placed on a metal surface of an object.

The present invention further provides an object comprising at least one metal surface and, against this surface, an electromagnetic transponder.

BRIEF DESCRIPTION OF THE DRAWINGS

The foregoing objects, features, and advantages of the present invention will be discussed in detail in the following non-limiting description of specific embodiments in connection with the accompanying drawings, in which:

FIG. 6 very schematically and functionally shows an embodiment of an inductive winding for forming an antenna of an electromagnetic transponder according to an embodiment of the present invention;

FIG. 7 illustrates the association of an electronic tag according to an embodiment of the present invention with a metal object;

FIG. 8 shows an antenna for an electromagnetic transponder according to a first embodiment of the present invention; and FIG. 9 shows an electromagnetic transponder provided with an antenna according to a second embodiment of the present invention.

Figure 1:
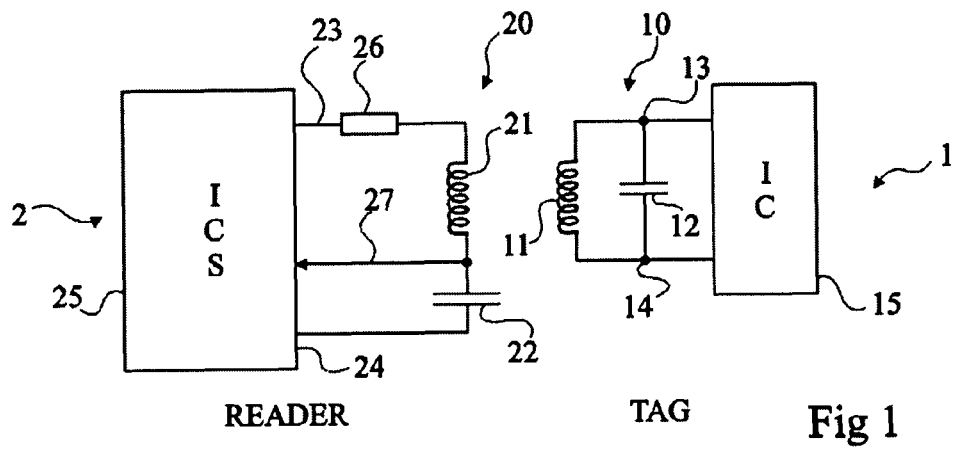
FIG. 1, previously described, is a schematic block diagram illustrating an example of an electromagnetic transponder system of the type to which the present invention applies.
Figure 2:
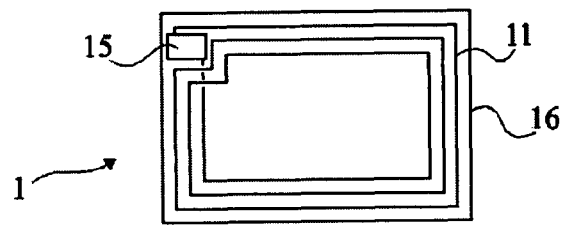
FIG. 2, previously described, is a very simplified top view of a conventional electronic tag.

The same elements have been designated with the same reference numerals in the different drawings. For clarity, only those elements that are necessary to the understanding of the present invention have been shown in the drawings and will be described hereafter. In particular, the exploitation of the signals sampled across an antenna of an electromagnetic transponder of the present invention have not been described in detail, since the present invention is compatible with conventional systems.

A feature of an embodiment of the present invention is to replace a planar winding for forming the electromagnetic transponder antenna with a coiled type winding to obtain a three-dimensional coil.

FIG. 6 functionally and very schematically shows an example of an antenna 50 according to the present invention. Antenna 50 is formed around a planar insulating element 52, of a first group of parallel conductive tracks p1 coplanar in a first plane (first surface of element 52), and of a second group of conductive tracks p2, also parallel to one another but coplanar in a second plane (second surface of element 52) parallel to the first one. Except for two end tracks (for example, the two end tracks of the first group), the two ends of each track are connected to two ends of two neighboring tracks of the other group, to form a three-dimensional conductive winding 51. In other words, one end of each track p1 is connected to an end of a track p2 having its other end connected to an end of another track p1.

Typically, thickness e of insulating element 52 is smaller than 2 millimeters. The equivalent inductance of a winding 51 of the type illustrated in FIG. 6 is a function of cross-section area S of element 52 parallel to the formed winding 51 and to the number of conductive turns.

Figure 3:
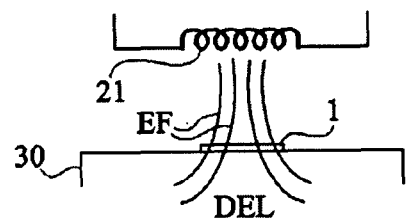
FIG. 3, previously described, illustrates the association of a conventional electronic tag with an insulating object.
Figure 4:
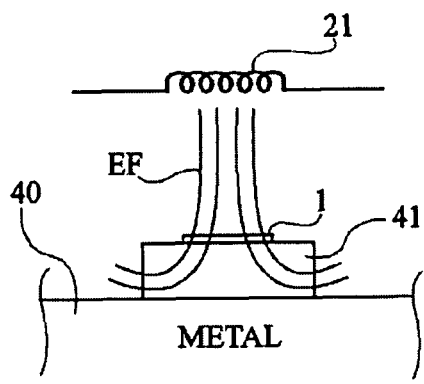
FIG. 4, previously described, illustrates a first conventional solution for associating an electronic tag with a metal object.
Figure 5:
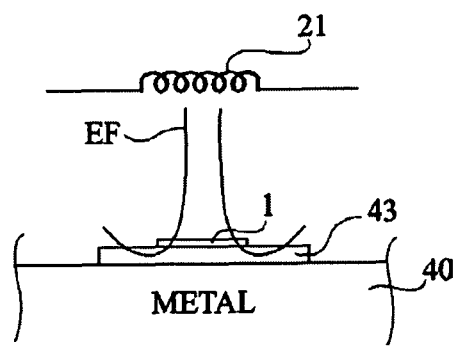
FIG. 5, previously described, illustrates a second conventional solution for associating an electronic tag with a metal object.

FIG. 7 very schematically illustrates in a view to be compared with the previously-described views of FIGS. 3 to 5, an example of association of an electronic tag 1' according to an embodiment of the present invention with a metal object 40 (METAL). An electromagnetic field (symbolized by field lines EF) radiated by an antenna 21 of a conventional read or read/write terminal crosses tag 1' in a direction parallel to the surface of object 40 on which tag 1' rests by passing through the middle of winding 51.

Disturbances of the metal object are thus avoided by avoiding to have to canalize the field perpendicular to the surface of this object, as is the case in FIGS. 4 and 5.

FIG. 8 shows in more detailed fashion a first example of the forming of an antenna 11' for an electromagnetic transponder according to the present invention. In this example, an insulating wafer 52', for example, of printed circuit board type (PCB), on the two surfaces of which are formed elongated, preferably rectilinear conductive tracks p1' (upper surface) and p2' (lower surface), is used. To form metal winding 51, the respective ends of tracks p1' and p2' are interconnected by means of conductive vias v running across the thickness of wafer 52'. The two ends of the winding define the inductance terminals and form, for example, terminals 13 and 14 of the resonant circuit of the transponder between which is connected a capacitive element (12, FIG. 1), not shown in FIG. 8.

In the embodiment of FIG. 8, it is possible to place an integrated circuit chip comprising the transponder circuits (15, FIG. 1) directly on the upper surface of wafer 52', provided to coat upper sections p1' of track 51 with an insulating material at least in the chip receive area.

The number of turns to be performed for the antenna depends on the operating frequency of the system. The present invention is particularly advantageous in high-frequency applications (for example, 13.56 MHz) since, for a same capacitance value of the electronic tag, the number of required turns is smaller than in lower-frequency applications (a few hundreds of kHz).

As a specific example of embodiment, antenna 11' is formed on a printed circuit board with a thickness of approximately 1 mm. The tracks are approximately 1 cm long and 0.5 mm wide and the tracks of a same group are spaced apart by approximately 0.5 mm.

FIG. 9 shows a second embodiment of an electromagnetic transponder antenna according to the present invention. The antenna is formed of parallel tracks p1" and p2" superposed in two metal levels placed on an integrated circuit chip 15. For simplification, the details of the active and/or passive areas of chip 15 have not been shown, nor have the other metallization levels generally required for the interconnects. Tracks p1' and p2' are separated by an insulator thickness 52" playing the role of the insulating element of the center of the formed winding. Conductive vias (not shown) connect the respective ends of tracks p1" and p2" to form the winding. Preferably, an insulating protection layer 53 (for example, the passivation layer) is deposited on the last metal level.

An advantage of the embodiment of FIG. 9 is that it enables forming the antenna directly on the integrated circuit chip forming the electromagnetic transponder exploitation circuits. Surface area is thus gained.

Another advantage of the embodiment of FIG. 9 is that it enables obtaining inductance values greater than those that can be obtained by using planar windings formed by metallization levels on an integrated circuit wafer.

Of course, the present invention is likely to have various alterations, modifications, and improvements which will readily occur to those skilled in the art. In particular, the dimensions to be given to a coil according to the present invention (especially, the track width, the interval between two neighboring tracks of a same group for insulation needs, the cross-section surface area of insulating element 52, etc.) to obtain an antenna adapted to an electromagnetic transponder based on the functional indications given hereabove are within the abilities of those skilled in the art according to the application aimed at (especially to the carrier frequency and to the size of the capacitive element).

Further, although the present invention has been more specifically described in relation with the use of a printed circuit board for, in the first embodiment, forming the antenna, any other insulating material may be used. The printed circuit is a preferred embodiment due to the mastery of conventional techniques to form metal tracks and vias therein.

The invention claimed is:

1. An inductive element, characterized in that it comprises: a first group of parallel conductive tracks coplanar in a first plane;
a second group of parallel conductive tracks coplanar in a second plane parallel to the first plane; and
an insulating material separating the two groups of tracks, one end of each track of the first group being connected to an end of a track of the second group having its other end connected to an end of another track of the first group, the connections between the first and second groups of tracks being conductive vias that cross through the insulating material,
wherein the first group of parallel conductive tracks is superimposed in a first metal level of a semiconductor wafer and the second group of parallel conductive tracks is superimposed in a second metal level of the semiconductor wafer.

2. An antenna for receiving a radio-frequency transmission, characterized in that it comprises the inductive element of claim 1.

3. An electromagnetic transponder comprising the antenna of claim 2.

4. The transponder of claim 3, wherein electronic circuits of the transponder are formed in the semiconductor wafer underlying the antenna.

5. The electromagnetic transponder of claim 3, disposed on a metal surface of an object.

6. An object comprising at least one metal surface, comprising, against the at least one metal surface, the transponder of claim 3.

7. An inductive element, comprising: an insulating material; a first group of conductive tracks on a first side of the insulating material, the first group of conductive tracks comprising a first track and a second track, the first group of conductive tracks being superimposed in a first metal level of a semiconductor wafer;
a second group of conductive tracks on a second side of the insulating material, the second group of conductive tracks comprising a third track and a fourth track, the second group of conductive tracks being superimposed in a second metal level of the semiconductor wafer; and
conductive connections between the first and second groups of conductive tracks, the conductive connections comprising a first conductive connection between the first track and the third track, a second conductive connection between the second track and the third track, and a third conductive connection between the second track and the fourth track, wherein each of the first, second and third conductive connections extends through the insulating material.

8. The inductive element of claim 7, wherein the conductive connection comprises conductive vias extending through the insulating material.

9. An antenna for receiving a radio-frequency transmission comprising the inductive element of claim 7.

10. An electromagnetic transponder comprising the antenna of claim 9.

11. An object comprising at least one metal surface, comprising, against the at least one metal surface, the transponder of claim 10.

12. A method of using a transponder comprising an antenna that includes an inductive element having an insulating material; a first group of conductive tracks on a first side of the insulating material, the first group of conductive tracks comprising a first track and a second track; a second group of conductive tracks on a second side of the insulating material, the second group of conductive tracks comprising a third track and a fourth track; and conductive connections between the first and second groups of tracks, the conductive connections comprising a first conductive connection between the first track and the third track, a second conductive connection between the second track and the third track, and a third conductive connection between the second track and the fourth track, wherein each of the first, second and third conductive connections extends through the insulating material, the first and second group of conductive tracks being superimposed a first and second metal level in a semiconductor wafer, respectively, the method comprising:
placing the transponder in contact with all object comprising metal at least at a surface of the object.

13. The method of claim 12, whereby the transponder is affixed to the object.

* * * * *